UNITED STATES PATENT OFFICE.

JOSEPH FRANKLIN GENT, OF COLUMBUS, INDIANA.

FLAKE RICE.

SPECIFICATION forming part of Letters Patent No. 312,265, dated February 17, 1885.

Application filed April 12, 1884. (No specimens.)

*To all whom it may concern:*

Be it known that I, JOSEPH FRANKLIN GENT, a citizen of the United States, residing at Columbus, in the county of Bartholomew and State of Indiana, have invented certain new and useful Improvements in an Article of Manufacture which I term Flake Rice; and I do hereby declare the following to be a full, clear, and exact description of the invention, such as will enable others skilled in the art to which it appertains to make and use the same.

The object of my invention is to furnish a product prepared from rice suitable for all uses to which the ordinary rice of commerce is put, and possessing the advantage, among others, that it can be more quickly and more satisfactorily cooked or reduced than either whole or ground rice.

To this end my invention consists of a new article of manufacture which, from its flaky nature, may be termed "flake rice" for the sake of distinction.

To prepare this flake rice, I take whole rice suitably cleaned, and, after softening it somewhat by steaming, reduce it to a coarse granular material by a suitable grinding-mill. The granular material is then again subjected to a steaming sufficient to further soften the granules and to such a degree that they may be rolled down without further reduction. The steamed granular material is finally, while still soft, passed through hot rolls, by which the granules are rolled out into flakes and dried at the same time. The rice-flakes thus prepared constitute the flake rice.

I claim as my invention—

As a new article of manufacture, flake rice, substantially as before set forth.

In testimony whereof I affix my signature in presence of two witnesses.

JOSEPH FRANKLIN GENT.

Witnesses:
E. T. WALKER,
W. M. HANNAY.